United States Patent [19] [11] 4,170,616
Jebens [45] Oct. 9, 1979

[54] METHOD OF FABRICATION OF A FRESNEL LENS

[75] Inventor: Robert W. Jebens, Skillman, N.J.

[73] Assignee: RCA Corporation, New York, N.Y.

[21] Appl. No.: 910,887

[22] Filed: May 30, 1978

[51] Int. Cl.² ............................................. B29D 11/00
[52] U.S. Cl. ...................................... 264/1; 264/102; 264/259
[58] Field of Search ...................... 264/1, 2, 101, 102, 264/90, DIG. 78, 571, 259

[56] References Cited
U.S. PATENT DOCUMENTS

| 2,831,394 | 4/1958 | Heenan et al. | 264/1 |
| 3,247,550 | 4/1966 | Haines, Jr. | 264/89 |
| 3,361,858 | 1/1968 | Wichterle | 264/1 |
| 3,739,455 | 6/1973 | Alvarez | 264/1 |
| 4,039,607 | 8/1977 | Miller | 264/1 |

*Primary Examiner*—James B. Lowe
*Attorney, Agent, or Firm*—H. Christoffersen; B. E. Morris; W. J. Burke

[57] ABSTRACT

A method for fabricating a Fresnel lens comprising a plastic layer contacted to a transparent substrate by evacuating a chamber formed by the lens mold and the substrate through a pumping tube; flowing a liquid plastic through the pumping tube into the chamber; and venting the pumping tube to the atmosphere so that atmospheric pressure forces the plastic to fill the entire chamber.

5 Claims, 4 Drawing Figures

METHOD OF FABRICATION OF A FRESNEL LENS

This invention is directed to a process for making a Fresnel lens. More particularly, this invention relates to a method for making a plastic Fresnel lens on a hard and durable substrate.

CROSS REFERENCE TO RELATED APPLICATION

This application is related to the application entitled, "Fresnel Lens" of Robert Warren Jebens, Ser. No. 910,946, filed concurrently herewith.

BACKGROUND OF THE INVENTION

A Fresnel lens is a regular array of refracting facets arranged according to whether the desired result is to form a lens of spherical or cylindrical symmetry. The refracting facets correspond to segments of the spherical or cylindrical lens of equivalent focal length. These segments are curved in an exact replica of the spherical or cylindrical lens segments, but in practice they are tangents to the curved surfaces of the individual segments, an approximation which is acceptable if the number of refracting facets per unit radius of the corresponding spherical or cylindrical lens is large enough. Typically a Fresnel lens will have from about 15 to 60 such elements per centimeter of radius of the lens.

For a solar energy concentrator the Fresnel lens must be cheap and have a long maintenance-free life. The cost of plastic Fresnel lenses presently available is too high to allow solar concentration techniques to be competitive with other power sources except in specialized applications. Plastic Fresnel lenses have the additional problems that they are susceptible to ultraviolet radiation degradation, are dimensionally unstable and have a high coefficient of thermal expansion, which in turn produces mounting and distortion problems. They are also soft and therefore susceptible to abrasion from wind blown particles and, during cleaning procedures, from particles adhering to the surface. These problems both increase the initial cost of such concentrators and shorten their useful life.

Jebens, in a copending application referred to above and incorporated herein by reference, has described a Fresnel lens which comprises a thin plastic layer, in which are formed the refractive facets, bonded to a transparent substrate. The substrate is low cost, dimensionally stable, has a low coefficient of thermal expansion, and is hard and therefore not susceptible to abrasion. The plastic layer is thin so that any increase in its absorption due to ultraviolet degradation does not result in significant light loss. Since the lens can be arranged with the plastic layer bonded to the side of the substrate opposed to the weather, the plastic layer is protected from abrasion by wind blown or adhering particles.

This novel Fresnel lens is a significant improvement over the prior art and will enhance the utility of the solar energy concentrator. Thus, a method of fabrication which would produce a lens with a plastic layer of minimum thickness and which would be economical and lend itself to large scale production would be most desirable.

SUMMARY OF THE INVENTION

The invention comprises a method of fabricating a Fresnel lens which includes the steps of placing a plastic mold, which is a negative of the Fresnel lens to be fabricated, against a transparent substrate so as to form a vacuum seal between the plastic mold and the surface of the substrate; inserting a pumping tube, which is connected to vacuum means and to a side reservoir containing a liquid plastic, through the plastic mold and into the chamber formed by the plastic mold and the substrate; evacuating air from the chamber, reservoir and pumping tube; flowing the liquid plastic down the pump tube and into said chamber; back filling the pumping tube with air to atmospheric pressure, thus forcing the liquid plastic to fill the chamber; curing or hardening the plastic; and removing the plastic mold.

DETAILED DESCRIPTION OF THE INVENTION

Figure 1:
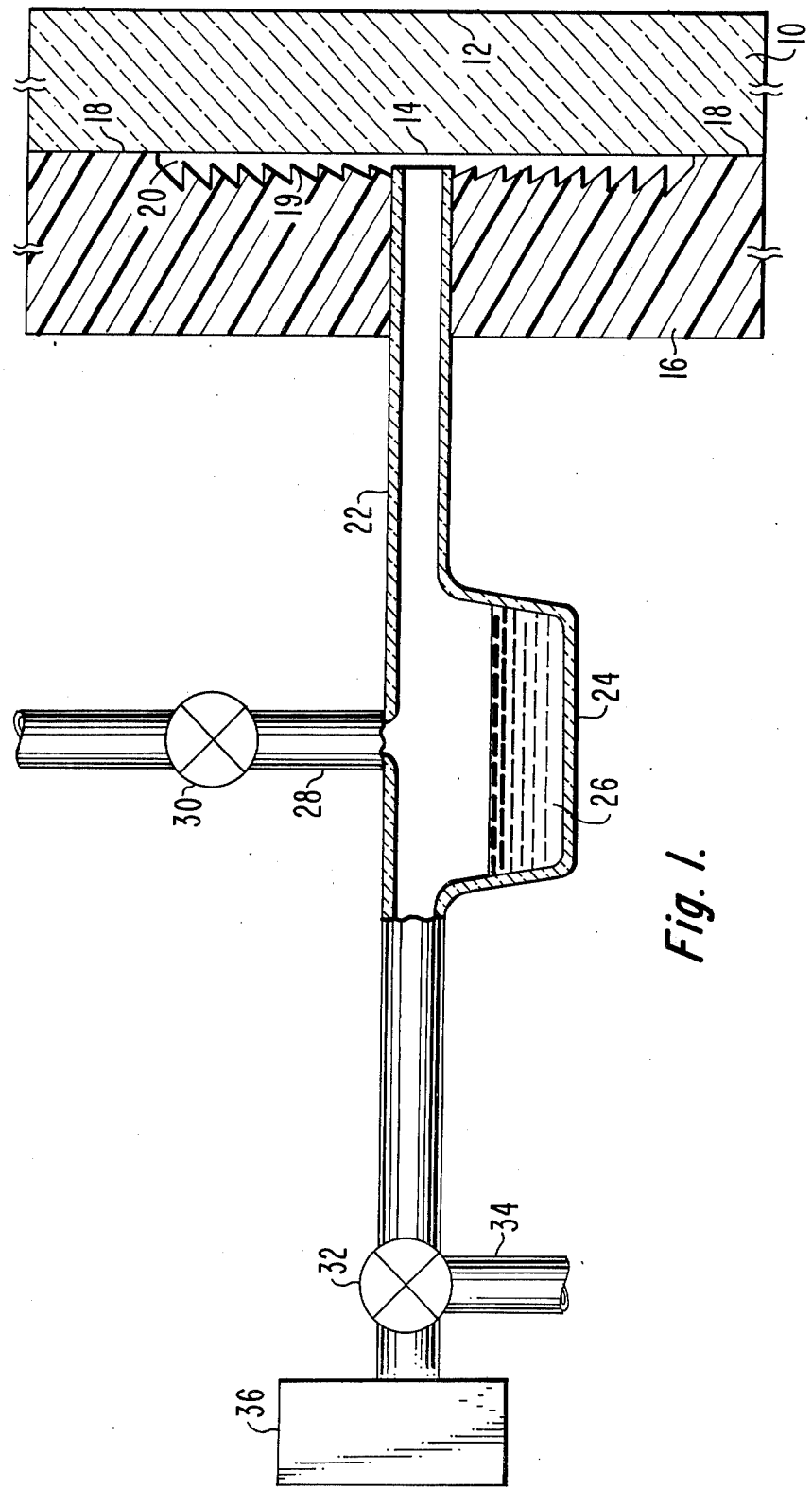
FIG. 1 illustrates a cross-sectional view of the apparatus used in the fabrication of a Fresnel lens, prior to allowing the liquid plastic to flow down the pump tube.
Figure 2:
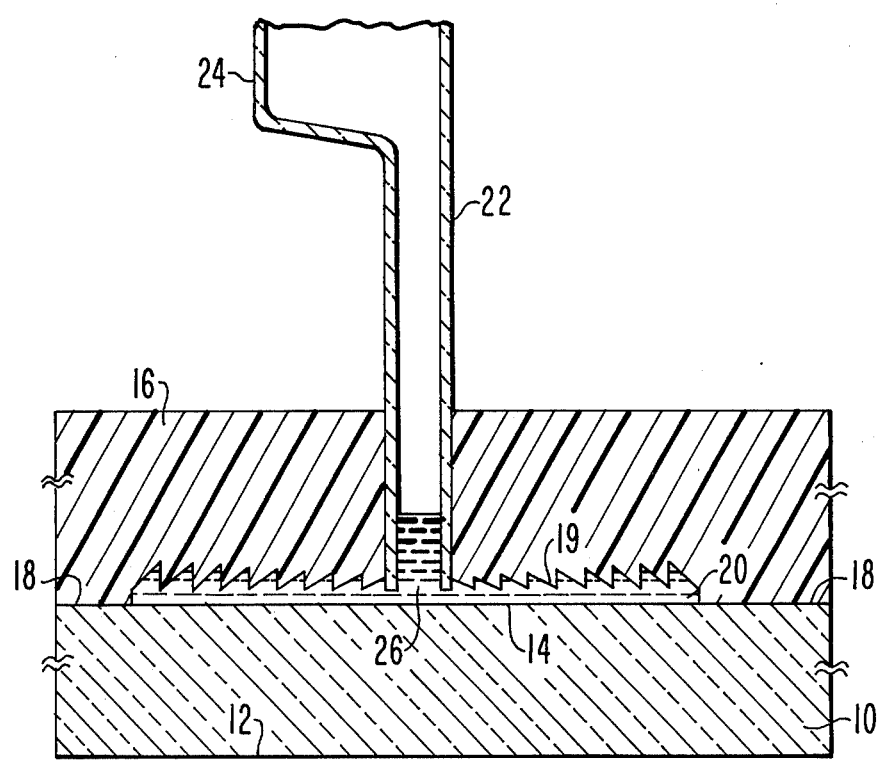
FIG. 2 illustrates a cross-sectional view of the plastic mold, substrate, and pump tube after the liquid plastic has been allowed to flow down the pump tube and into the plastic mold.

FIGS. 1 and 2 show a schematic illustration of an apparatus suitable for use in the fabrication of a Fresnel lens. A transparent substrate 10 has two opposed surfaces 12 and 14. A flexible plastic mold 16 is placed onto the surface 14 of the transparent substrate 10 forming a vacuum seal in the regions 18 along the periphery of the plastic mold 16 and substrate 10. The plastic mold has in its face facets 19 which are the negative of the facets of the Fresnel lens to be fabricated. The plastic mold 16 and transparent substrate 10 form a chamber 20 which is essentially the facet volume.

A pumping tube 22 is inserted through a hole in the plastic mold 16 so that the air in the chamber 20 can be evacuated. Attached to the pumping tube 22 is a reservoir 24 which contains a liquid plastic 26. Opposite the reservoir 24 is a fill tube 28 and shutoff valve 30 through which liquid plastic can be introduced to fill the reservoir 24. A two-way valve 32 in the pumping tube 22 permits the pumping tube 22 and chamber 20 to be either evacuated, using a vacuum means 36, or vented to the atmosphere through vent tube 34.

Figure 3:
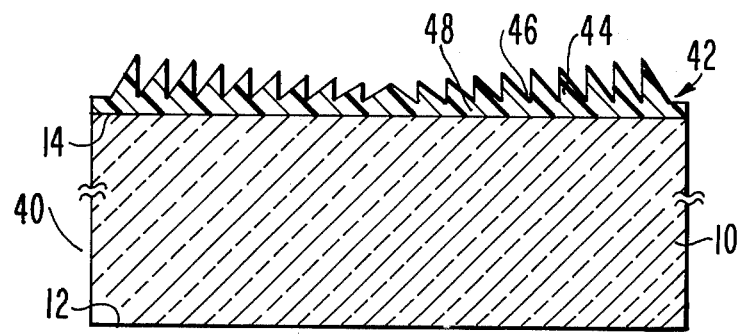
FIG. 3 illustrates a cross-sectional view of a Fresnel lens prepared by the present process.
Figure 4:
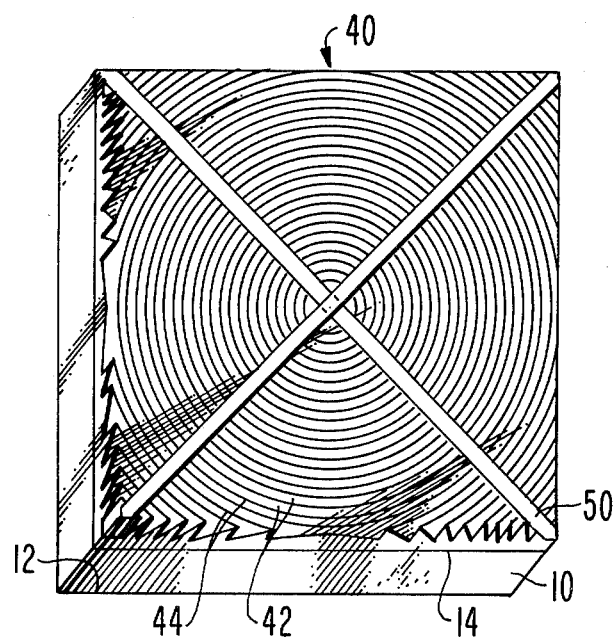
FIG. 4 illustrates a planar view of a Fresnel lens prepared by the present process.

FIGS. 3 and 4 are schematic illustrations of cross-sectional and planar views, respectively, or a Fresnel lens 40 fabricated by the method of the invention. The lens comprises a transparent substrate 10 having opposed surfaces 12 and 14. Bonded to the surface 14 of said substrate is the plastic layer 42. This plastic layer 42 has refracting facets 44 which correspond to the segments of the master Fresnel lens used to form the mold. A particular set of facet interconnect channels 50 used in the lens fabrication are shown in FIG. 4.

Using the fabrication technique of the invention the grooves 46 between the individual facets 44 reach down essentially to the glass surface 14. The thickness of the sublayer 48 varies from zero to about 0.0075 cm, which is less than it is possible to obtain using other conventional molding or casting methods. The overall thickness of plastic layer 42 can vary from about 0.025 to about 0.10 cm. It is desirable that the thickness of sublayer 48 be as thin as possible since bulk sheer stresses, produced by thermal expansion and contraction during manufacture and use, can cause loss of bonding of the plastic layer 42 to the substrate 10.

The invention is a multi-step process for the fabrication of the novel Fresnel lens.

Prior to the fabrication of the Fresnel lens a plastic mold which is flexible after curing or hardening is made. This plastic mold is flexible so that it can conform to the surface of the transparent substrate to facilitate formation of a vacuum seal and minimize thickness variations in the finished plastic layer.

Interconnect channels between lens facets are required to allow air to be removed from the chamber and to allow the liquid plastic to fill the mold by running along said channels and tangentially along the lens facets. These interconnect channels can be formed in different ways such as by adhering a plastic tape, about 0.025 centimeter thick and about 0.1 centimeter wide to the master lens in the desired pattern of said interconnect channels before the plastic mold is formed.

The plastic mold may be formed by casting a silicone rubber such as General Electric Company's RTV 11 or RTV 630 or Dow Corning Corporation's Silastic J or L against the master lens. After the casting or molding operation is completed, the mold is removed from the master lens and the plastic plating tape is removed, leaving a pattern of interconnecting channels between the lens facets. The mold is then suitable for use in the invention.

The mold 16 is placed against the transparent substrate 10. The reservoir 24 is filled with a liquid plastic 26. The pumping tube 22 is then inserted into the plastic mold 16. The air in the chamber 20 and pumping tube 22 is removed using the vacuum means 36. Since the liquid plastic 26 is also exposed to this vacuum, any gas bubbles in the liquid plastic will be pumped away.

When the air pressure has reached a value between 10 and 100 torr the entire apparatus is tipped from the horizontal to the vertical position. The liquid plastic 26 runs down the pumping tube 22 and partially fills the chamber 20. The pumping tube 22 is then vented to the atmosphere using valve 32. Pressure over the liquid plastic 26 forces the liquid plastic 26 to run along the interconnect channels 50 and completely fill the facets 19 of the mold. The pumping tube 22 is then removed. After the liquid plastic has cured or hardened, the mold 16 is separated from the substrate 10 and the cured or hardened plastic 26. The Fresnel lens is then ready for use.

It is to be understood that the invention is not limited to the apparatus used to describe the invention but includes such modifications as would be evident to one skilled in the art.

The substrate 10 may be formed of a transparent material such as glass whose surfaces 12 and 14 have a flat, smooth finish similar to that normally found for window glass. Tempered glass is preferred due to its resistance to mechanical and thermal stresses. Low-iron-oxide glass is preferred for its improved light transmission efficiency in the 700 to 1100 nanometer wave length region. A suitable substrate material is a tempered, low-iron-oxide glass such as Lo-Iron, a registered trademark of ASG Industries, Inc. In addition, a glass with strong optical absorption at wavelengths less than 400 nanometers would be preferred to reduce ultraviolet degradation of the transparent plastic layer 42.

The plastic layer 42 can be made of any transparent plastic which is a liquid during fabrication of the lens, will cure or harden to a solid at room temperature and will bond to the substrate. Useful transparent plastics include Silastic rubbers such as Sylgard 184, a registered trademark of the Dow Corning Corporation, and mixtures of epoxy resins and curing agents such as epoxy resin TE6175 and curing agent HD3561 or OSO 100 epoxy resin and curing agent mixture manufactured by Hysol Division of the Dexter Corporation.

The following Example serves to illustrate the invention.

EXAMPLE

A plastic mold was formed by casting RTV 11 silicone rubber manufactured by the General Electric Company onto a master which was a commercially available cast acrylic Fresnel lens which had a 15 centimeter focal length and a 15 centimeter diameter. Interconnect channels between individual facets were formed by laying a 0.025 centimeter thick and 0.1 centimeter wide plastic tape onto the facets of the master lens before casting the silicone rubber onto the master. After the silicone rubber had cured the mold was removed from the master lens. A 0.8 centimeter diameter hole was cut through the center of the mold perpendicular to the facet plane. The mold was placed face down on a sheet of 0.32 centimeter thick glass. A glass tube was inserted into this hole and connected through a two way valve to a vacuum pump. A side reservoir connected to this tube contained a mixture of about 100 parts by weight of Hysol TE6175 epoxy resin and about 29 parts by weight of Hysol HD3561 curing agent. The two way valve was opened allowing the vacuum pump to pump away air from the chamber pumping tube, and the reservoir which contained the epoxy resin and curing agent mixture. As the air pressure over the epoxy resin and curing agent mixture was reduced, any trapped air or other gases were pumped away, eliminating any gas bubbles which may be present in the plastic precursor mixture and which would be occluded in the cured resin. When the air pressure in the chamber reached a value of between 10 torr and 100 torr, the apparatus was tipped to allow the epoxy resin and curing agent mixture contained in the side bulb to run down into the mold. The two-way valve was then closed, and the pumping tube was vented to the atmosphere through this valve, thus forcing the liquid epoxy resin to fill the mold by running along the interconnect channels and then tangentially along the circular facets. Since the interior of the mold was then at atmospheric pressure, any distortion in the mold due to an air pressure differential was relieved while the epoxy resin and curing agent mixture was still liquid.

The epoxy resin and curing agent mixture was allowed to cure for approximately 24 hours. The mold was then removed leaving a pattern of refracting facets which were a replica of the master lens bonded to the glass substrate.

The lens thus formed had about the same focal length as the master. The plastic layer exhibited excellent adhesion to the glass substrate.

I claim:

1. A method of fabricating a Fresnel lens, comprised of a thin plastic layer contacted to a transparent substrate, which comprises:

placing a flexible mold against a transparent substrate so as to form a chamber therebetween bounded by the substrate, the extended sides of the mold and the mold face which contains facets which are the negative of the facets of the Fresnel lens to be fabricated and the facet interconnect channels;

inserting a pumping tube, connected to vacuum means and a side reservoir containing a liquid plastic, through the mold and into the chamber formed by said mold and said substrate;

evacuating the air present from said chamber and said pumping tube;

flowing said liquid plastic downward through said pumping tube into said chamber to partially fill said chamber;

venting said pumping tube to the atmosphere thus forcing the liquid plastic to flow along the said facet interconnect channels and fill the chamber due to atmospheric pressure over the plastic;

curing or hardening the plastic; and removing the mold; whereby distortion of the mold is presented by having no pressure differential between the interior and exterior of the mold.

2. The method according to claim 1 wherein said mold is formed from a silicone rubber.

3. The method according to claim 1 wherein said substrate is glass.

4. The method according to claim 1 wherein said liquid plastic is a mixture of an epoxy resin and curing agent.

5. The method according to claim 1 wherein the air pressure in said chamber and pumping tube is reduced to between 10 and 100 torr.

* * * * *